(12) United States Patent
Decker et al.

(10) Patent No.: US 11,551,299 B2
(45) Date of Patent: Jan. 10, 2023

(54) TRADE ACTION CONFIRMATION TOOL

(71) Applicant: TRADING TECHNOLOGIES INTERNATIONAL INC., Chicago, IL (US)

(72) Inventors: Stephen P. Decker, Naperville, IL (US); Brien D. Grey, Charlotte, NC (US)

(73) Assignee: Trading Technologies International, inc., Chicago, IL (US)

( * ) Notice: Subject to any disclaimer, the term of this patent is extended or adjusted under 35 U.S.C. 154(b) by 132 days.

(21) Appl. No.: 16/991,729

(22) Filed: Aug. 12, 2020

(65) Prior Publication Data

US 2021/0049692 A1    Feb. 18, 2021

Related U.S. Application Data

(63) Continuation of application No. 16/668,932, filed on Oct. 30, 2019, now Pat. No. 10,776,873, which is a continuation of application No. 16/146,799, filed on Sep. 28, 2018, now Pat. No. 10,515,411, which is a continuation of application No. 13/368,117, filed on Feb. 7, 2012, now Pat. No. 10,121,195.

(51) Int. Cl.
*G06Q 40/04* (2012.01)
*G06Q 40/00* (2012.01)

(52) U.S. Cl.
CPC ............. *G06Q 40/04* (2013.01); *G06Q 40/00* (2013.01)

(58) Field of Classification Search
CPC .............................. G06Q 40/04; G06Q 40/00
See application file for complete search history.

(56) References Cited

U.S. PATENT DOCUMENTS

| | | | |
|---|---|---|---|
| 7,747,528 B1 | 6/2010 | Robinson et al. | |
| 10,121,195 B2 | 11/2018 | Decker et al. | |
| 10,515,411 B2 | 12/2019 | Decker et al. | |
| 2002/0111890 A1 | 8/2002 | Sloan et al. | |
| 2002/0118961 A1 | 8/2002 | Choi | |
| 2004/0059662 A1 | 3/2004 | Stark | |
| 2006/0080214 A1* | 4/2006 | Hausman | G06Q 40/00 705/37 |

(Continued)

FOREIGN PATENT DOCUMENTS

JP    2004178226 A  *  6/2004

OTHER PUBLICATIONS

Wu-chang Luo, Spread Arbitrage between Stock Index Futures in Taiwan: A Cointegration Approach, Nov. 14, 2002, University of Southampton, web, 1-41 (Year: 2002).*

(Continued)

*Primary Examiner* — I Jung Liu
(74) *Attorney, Agent, or Firm* — McDonnell Boehnen Hulbert & Berghoff LLP

(57) ABSTRACT

Systems, methods, and apparatus for confirming trade actions are disclosed. An example method includes displaying a trade action cell corresponding with a trade action, receiving an initiation command, determining that the trade action was initiated based on the initiation command, receiving a confirmation command, wherein the confirmation command is a selection of the same trade action cell, and executing the trade action based on reception of the confirmation command.

9 Claims, 7 Drawing Sheets

(56) References Cited

U.S. PATENT DOCUMENTS

| | | |
|---|---|---|
| 2007/0038550 A1* | 2/2007 | Caille .................. G06Q 40/04 705/37 |
| 2013/0013487 A1 | 1/2013 | Sellberg et al. |
| 2013/0204760 A1 | 8/2013 | Decker et al. |
| 2019/0035022 A1 | 1/2019 | Decker et al. |
| 2020/0074550 A1 | 3/2020 | Decker et al. |

OTHER PUBLICATIONS

Bicchierai, Roberto, "Easy to confirm! A jQuery confirm plug in", http://roberto.open lab.com/2012/01/26/easy-to-confirm/.
Brown, Jared, "jQuery Confirm Plugin", https://talentopoly.com/posts/5626jquery_confirm_plugin.
JQuery NPL: "jQuery Confirm Plugin" by Nadia Alramli and "jQuery-ConfirmButton" retrieved from GitHub.com.

\* cited by examiner

TRADE ACTION CONFIRMATION TOOL

CROSS REFERENCE TO RELATED APPLICATIONS

The present application is a continuation of U.S. patent application Ser. No. 16/668,932, filed Oct. 30, 2019, which is a continuation of U.S. patent application Ser. No. 16/146,799, filed Sep. 28, 2018, now U.S. Pat. No. 10,515,411, which is a continuation of U.S. patent application Ser. No. 13/368,117, filed Feb. 7, 2012, now U.S. Pat. No. 10,121,195, the contents of each of which are fully incorporated herein by reference for all purposes.

FIELD OF THE DISCLOSURE

The disclosure is related to electronic trading environments and, more particularly, to confirmation of trade actions.

BACKGROUND

An electronic trading system generally includes a trading device in communication with an electronic exchange. The electronic exchange provides market data to the trading device. Market data includes, for example, price data, market depth data, last traded quantity data, and/or any data related to a market for a tradeable object. In some electronic trading systems, the trading device sends trade orders to the electronic exchange. Upon receiving a trade order, the electronic exchange attempts to match quantity of the trade order with quantity of one or more contra-side trade orders.

In some electronic trading systems, confirmation of a trade action, such as sending a trade order to the electronic exchange, is required.

BRIEF DESCRIPTION OF THE DRAWINGS

Features, aspects, and advantages of the present disclosure are better understood with regard to the following description, appended claims, and accompanying drawings, where:

Figure 1:
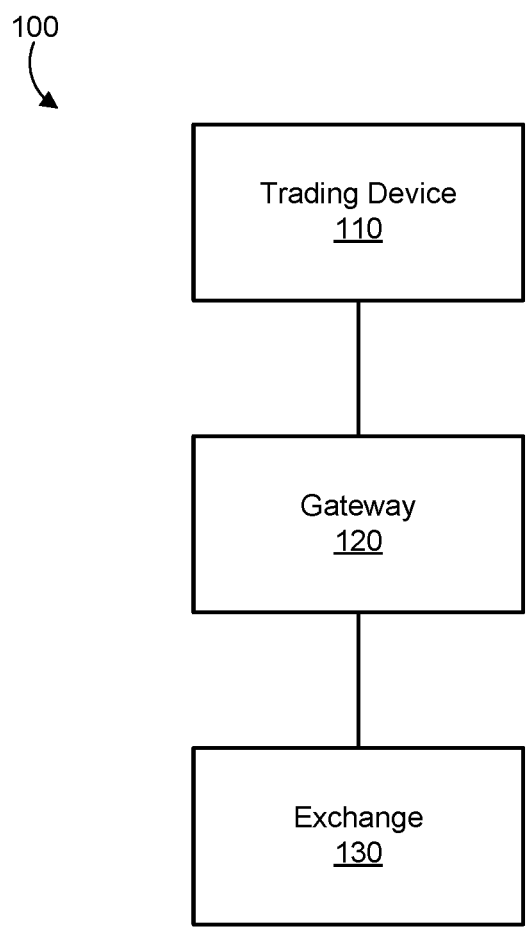
FIG. 1 illustrates a block diagram of an electronic trading system in which certain embodiments may be employed.

In addition, the drawings are for the purpose of illustrating example embodiments, but it is understood that the present disclosure is not limited to the arrangements and instrumentalities shown in the drawings.

DETAILED DESCRIPTION

I. Overview

The disclosed embodiments relate to systems and methods for confirming trade actions. In particular, the present embodiments relate to a tool that enables a market participant to confirm trade actions without the need for a confirmation window.

The present embodiments may relate to electronic trading. Electronic trading systems typically include an electronic exchange and a trading device. The electronic exchange provides market data to the trading device. The trading device may receive market data from the electronic exchange or even other devices or systems (e.g., a news feed). The received market data is displayed on a trading screen, which is a graphical interface that allows a market participant (e.g., a trader) to interact with the electronic exchange.

Trading screens allow market participants to initiate one or more trade actions. As used herein, a trade action may be any action performed on behalf of a market participant. Trade actions may include those actions which expose/remove the market participant to/from risk. As examples, trade actions may include placing, cancelling, or changing a trade order, and may also include initiating the execution of an algorithm on a server. However, trade actions may also be actions that do not have any immediate risk implications. As examples, trade actions may include sending a message to another market participant, establishing a connection with an electronic exchange, or setting a limit, timer, or default. Trade actions may also include deploying an algorithm to a server.

In general, traders desire to be able to react more quickly than other market participants. For example, market participants generally desire to be "first-to-market" (e.g., have orders entered prior to other market participants entering the same or similar orders). It is therefore desirable to improve the way market data is displayed to the trader and to allow the trader to make fast and accurate order entry. The slightest speed advantage may give a trader a significant competitive advantage.

A trade action cell is a cell, button, or area on a trading screen that corresponds to a particular trade action. In some embodiments, when the trade action cell is selected, the trading device may perform the corresponding trade action.

However, even though speed is important, a mistake may be very costly to a market participant, and it is therefore desirable for a market participant to have an ability to confirm trade actions. Some systems require a market participant to confirm trade actions before the system will perform the action on behalf of the market participant. Typically, these systems display a separate confirmation window once a trade action is initiated. Prior to the trade action being performed, the market participant must confirm the trade action using the confirmation window. While this may reduce the chances that a mistake is made, it increases the time taken to place an order because the market participant is required to move the cursor from the trade action cell to the confirmation window in an effort to confirm the trade action.

In an embodiment, a trade action cell that is used to initiate a trade action is also the trade action cell that is used to confirm the trade action. Initiating and/or confirming a trade action may include selection of a trade action cell. In some embodiments, once a trade action has been initiated, a market participant is unable to confirm a trade action using the same trade action cell until a certain period of time has elapsed. In some embodiments, after the trade action has been initiated but before it has been confirmed, the trade action cell that was used to initiate the trade action may change visually. Since the same trade action cell is used for initiation and confirmation, a separate confirmation is not needed.

Although the following discloses embodiments including, among other components, software executed on hardware, it should be noted that the disclosed embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

II. Brief Description of Certain Embodiments

Certain embodiments provide a method including displaying, by a computing device, a trading screen, wherein the trading screen is a trading interface that includes a trade action cell corresponding with a trade action. The example method includes receiving, by the computing device, an initiation command, wherein the initiation command is a selection of the trade action cell. The example method includes determining, by the computing device, that the trade action was initiated based on the initiation command. The example method includes receiving, by the computing device, a confirmation command, wherein the confirmation command is a selection of the same trade action cell. The example method includes executing, by the computing device, the trade action based on reception of the confirmation command.

Certain embodiments provide an apparatus including a trading interface to display a first display element associated with a trade action and a second display element associated with a confirmation action, the first display element and the second display element being selectable by a user. The example apparatus includes a computing device to receive an initiation command and a confirmation command, wherein the initiation command is a selection of the first display element and the confirmation command corresponds to a selection of the second display element.

Certain embodiments provide a tangible computer readable storage medium including a set of instructions for execution by a processor, wherein the set of instructions, when executed, implement a method. The example method includes displaying a trading interface to display a trade action cell corresponding with a trade action. The example method includes receiving an initiation command, wherein the initiation command is a selection of the trade action cell. The example method includes determining that the trade action was initiated based on the initiation command. The example method includes receiving a confirmation command, wherein the confirmation command is a selection of the same trade action cell. The example method includes executing the trade action based on reception of the confirmation command.

III. Example Electronic Trading System

FIG. 1 illustrates a block diagram of an electronic trading system 100 in which certain embodiments may be employed. The system 100 includes a trading device 110, a gateway 120, and an electronic exchange ("exchange") 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. Market data is sent from the exchange 130 through the gateway 120 to the trading device 110. The user may utilize the trading device 110 to monitor this market data and/or base a decision to send an order for a tradeable object on the market data.

A tradeable object is anything that may be traded with a quantity and/or a price. For example, financial products, including stocks, options, bonds, futures, currency, warrants, funds, derivatives, securities, commodities, swaps, interest rate products, index based products, traded events, goods, and collections and/or combinations of these are tradeable objects. A tradeable object may be "real" or "synthetic." A real tradeable object includes products that are listed and/or administered by an exchange. For example, a real tradeable object may be the underlying stock or an exchange listed spread. A synthetic tradeable object includes products that are defined by the user. This may include a combination of real or other synthetic products. There may be a real tradeable object that corresponds and/or is similar to a synthetic tradeable object.

The trading device 110 may include one or more electronic computing platforms such as a hand-held device, laptop, desktop computer, workstation with a single or multi-core processor, server with multiple processors, and/or cluster of computers. For example, while represented as a single device in FIG. 1, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading windows. The market data may be received from exchange 130, for example. As another example, the market data may be received from a simulation environment that provides historical data and/or simulates an exchange but does not effectuate real-world trades. This processing may be based on user preferences. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 is a computing device. For example, the trading device may include an electronic trading workstation, a portable trading device, an algorithmic trading system such as a "black box" or "grey box" system, an embedded trading system, and/or an automated trading tool. By way of illustration, the trading device 110 may be a personal computer running a copy of X_TRADER®, an electronic trading platform provided by Trading Technologies International, Inc. of Chicago, Ill. As another example, the trading device 110 may be a server device running an automated trading tool such as AUTOSPREADER® and/or AUTOTRADER™, also provided by Trading Technologies International, Inc.

As another example, the trading device 110 may include a trading application that algorithmically processes market data and includes a user interface for manual placement of orders based on the algorithmic processing or to manipulate orders that were placed automatically. An algorithmic trading application is a trading application that includes an automatically processed algorithm to perform certain actions. For example, the trading application includes an automated series of instructions to perform defined action(s). The actions may include processing market data in a particular way, placing an order, modifying an existing order, deleting an order, refraining from placing an order, selecting which tradeable object(s) to act on, determining a price at which to place or modify an order, determining a quantity at which to place or to which to modify an order, determining whether an order should be to buy or sell, and delaying action for a period of time, as examples.

As used herein, an algorithm (also referred to as a trading algorithm) is specified by a definition that includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into a computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment which does not effectuate real-world trades.

The orders sent by the trading device 110 may be sent at the request of a user or automatically. For example, a trader may utilize the trading device 110 to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market data, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market data. A user may use the trading screen to place buy and sell orders for tradeable objects or to otherwise trade the tradeable objects based on the displayed information, for example.

Trading screens may display one or more trading tools, which are electronic tools that allow, assist with, and/or facilitate electronic trading. Exemplary trading tools include but are not limited to charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, as examples.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the orders based on fill confirmations received from the exchange 130, as examples. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, as examples.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, as examples.

The exchange 130 may be owned, operated, controlled, or used by an exchange entity. Example exchange entities include the CME Group, the London International Financial Futures and Options Exchange ("LIFFE"), the IntercontinentalExchange ("ICE"), and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others of which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. The orders may be received from other devices in communication with the exchange 130. For instance, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system. The market data may be provided to the trading device 110. For example, the market data may be provided to the trading device 110 through the gateway 120. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information. There may be gaps in market depth. For example, the first three price levels may have market depth and the fifth through the eighth price levels may have market depth. However, the fourth level may not have any depth (e.g., no orders have been placed at this price level) at a given point in time. The market depth may change.

FIG. 1 illustrates an exemplary system 100. Additional, different, or fewer devices may be provided. For example, in certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

IV. Example Computing Device

Figure 2:
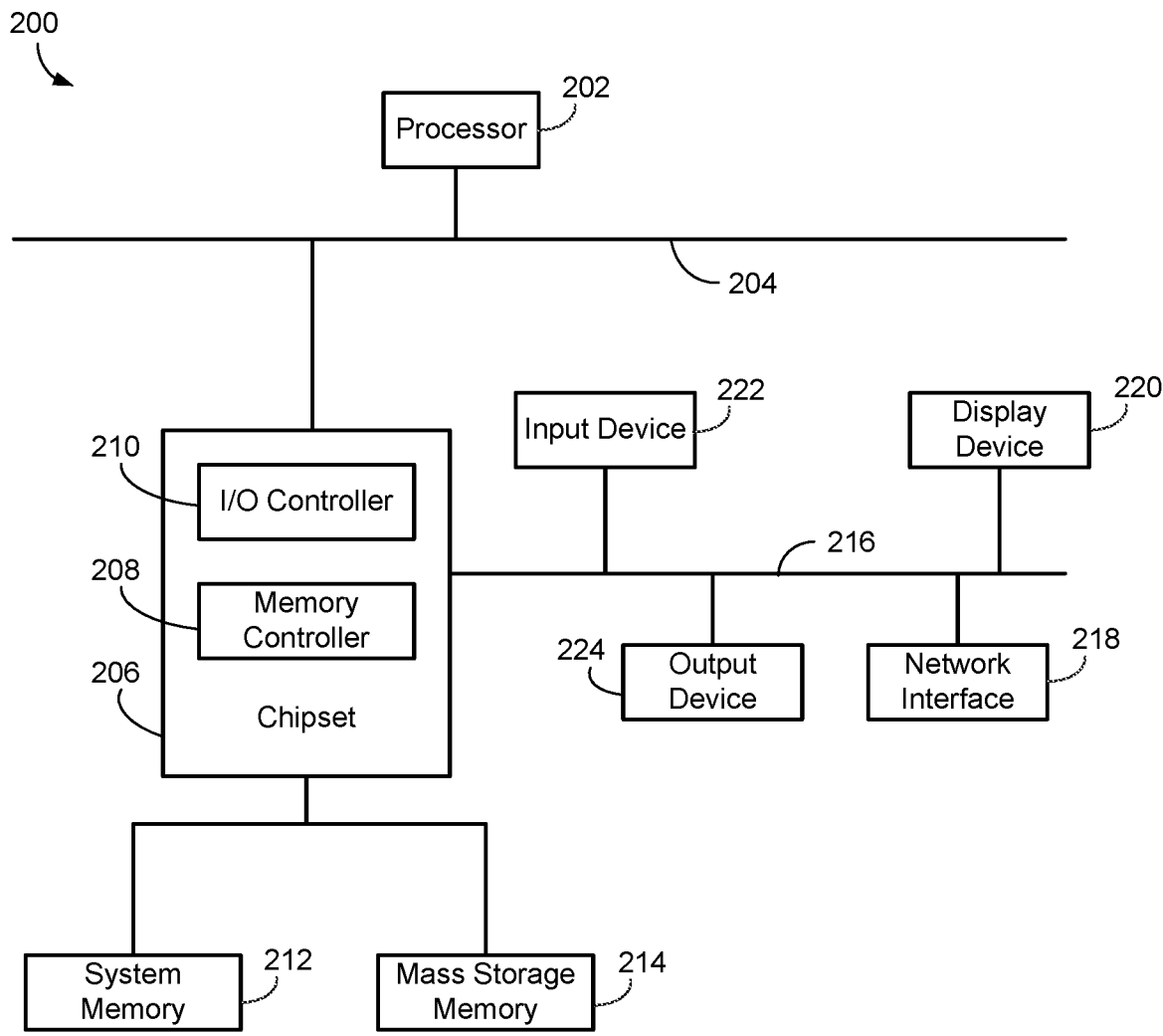
FIG. 2 illustrates a block diagram of an example computing device that may be used to implement at least one embodiment.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/output (I/O) controller 210, a system memory 212, a mass storage memory 214, an I/O bus 216, a network interface 218, a display device 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 coupled to an interconnection bus 204. The interconnection bus 204 may include a communication bus, channel, network, circuit, switch, fabric, or other mechanism for communicating data between components in the computing device 200. The interconnection bus 204 may be communicatively coupled with, and transfer data between, any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be any suitable processor, processing unit, or microprocessor. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. As is well known, a chipset typically provides I/O and memory management functions as well as a plurality of general purpose and/or special purpose registers, timers, etc. that are accessible to or used by one or more processors coupled to the chipset 206. The memory controller 208 performs functions that enable the processor 202 (or processors if there are multiple processors) to access the system memory 212 and the mass storage memory 214.

The system memory 212 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The mass storage memory 214 may include any desired type of mass storage device including hard disk drives, optical media, magnetic tape or disk, etc.

The system memory 212 and the mass storage memory 214 may be a single memory module, for example. The system memory 212 and the mass storage memory 214 may be adjacent to, part of, programmed with, networked with, and/or remote from processor 202, such that the data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The system memory 212 and/or the mass storage memory 214 may store a set of instructions for execution by a processor. The set of instructions, when executed, may perform certain acts. For example, when executed, the instructions may display a trading interface to display a trade action cell corresponding with a trade action, receive an initiation command, wherein the initiation command is a selection of the trade action cell, determine that the trade action was initiated based on the initiation command, receive a confirmation command, wherein the confirmation command is a selection of the same trade action cell, and execute the trade action based on reception of the confirmation command. In certain embodiments, the set of instructions may perform additional, different, or fewer acts.

The I/O controller 210 performs functions that enable the processor 202 to communicate with the network interface 218, the display device 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the I/O bus 216 may be coupled with a gateway similar to gateway 120 of FIG. 1 discussed above via the network interface 218, so one, some, or all of the components of the computing device 200 are accessible to or may communicate with the gateway. As another example, the network interface 218 may couple the I/O bus 216 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

V. Example Trade Confirmation Systems and Methods

Figure 3:
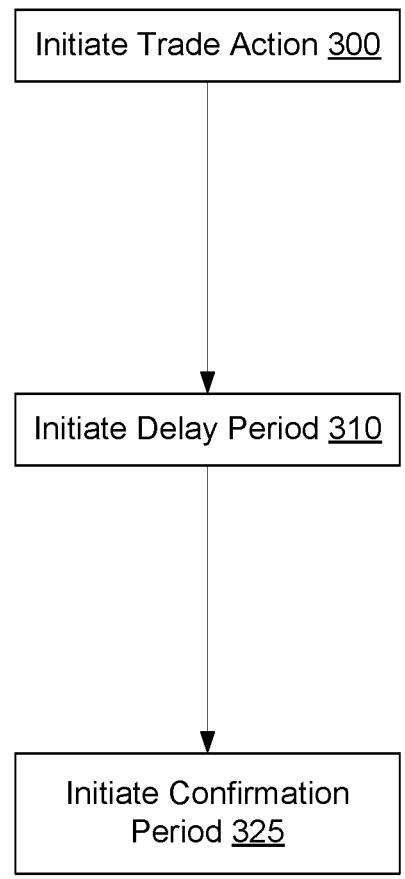
FIG. 3 is a flowchart representative of an example method illustrating an example timing diagram of initiating, delay period, confirmation period and time-out.

FIG. 3 is a flowchart describing an example method to initiate a trade action. The example method of FIG. 3 may correspond to a timing diagram, such as the timing diagram of FIG. 4.

At Block 300, a trade action is initiated when an initiation command is received. This may occur through a trade action cell (e.g., a BUY cell, a CANCEL cell, a SELL cell, etc.). In some embodiments, initiating and/or confirming a trade action may occur automatically (e.g., without receiving a manual selection command from the market participant). In some embodiments, the trade action initiation command may be initiated automatically by a trading algorithm, and may require the market participant to confirm the trade action. For example, the trading device 110 may include a trading application that algorithmically processes market data and includes a user interface for manual placement of orders based on the algorithmic processing or to manipulate orders that were placed automatically.

In some embodiments, initiating and/or confirming a trade action may include receiving the selection of a trade action cell. In some embodiments, selecting a trade action cell may include clicking on a cell (e.g., one, two, or more clicks on a cell). In some embodiments, selecting a trade action cell may include hovering a cursor over a cell or chart for a certain period of time. In some embodiments, selecting a trade action cell may include receiving a verbal command from a user (e.g., "submit a trade order for tradeable object A at a price of 98.7"). The verbal command may be associated with a trade action cell. In some embodiments, when the trade action cell is selected, the trading device 100 may perform the corresponding trade action.

Figure 4:
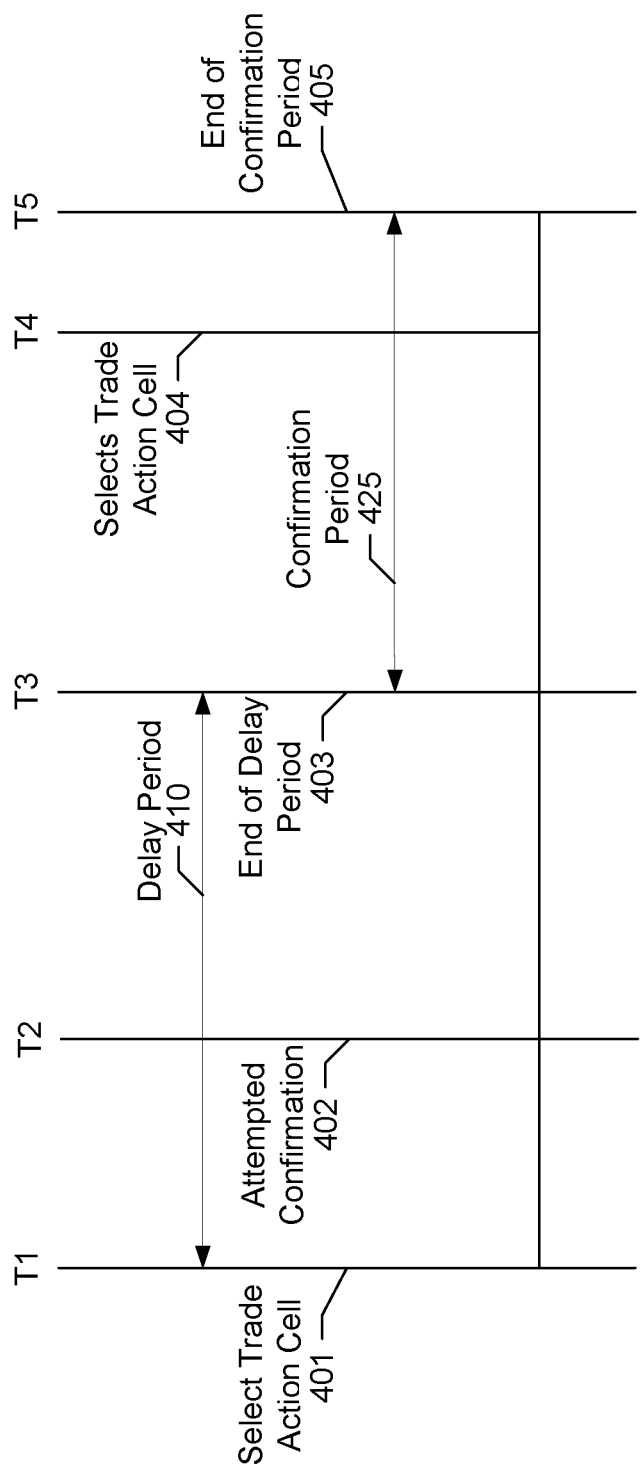
FIG. 4 is a timing diagram of initiating, delay period, confirmation period and time-out.

At Block 310, a delay period is initiated. This may occur after a trade action has been initiated. As shown in FIG. 4, the delay period 410 begins at time T1 when the trade action is initiated by selecting a trade action cell 401, and continues until the end of the delay period 403, which occurs at time T3.

In some embodiments, there is no delay period 410. Instead, a confirmation period, which is discussed more below, is initiated when a trade action is initiated. For example, the trading application providing the confirmation tool may not provide the option of a delay period. In another example, the delay period may be set to zero seconds, which essentially eliminates the delay period.

In some embodiments, the delay period may be for a fixed period of time (e.g., 20 ms, 50 ms, 100 ms, 200 ms, 750 ms, 1 second, 2 seconds, etc.). In some embodiments, the delay period is for a predefined period of time. The predefined period of time may be set by the trader. Different trade actions may have different delay periods. For example, the delay period for submission of a trade order may be longer than the delay period for cancelling a trade order. In some embodiments, different trade parameters may influence the length of the delay period. For example, the delay period for submission of a trade order with a high level of risk (e.g., a price of 98.8 or a quantity of 100 contracts) may be longer than the delay period for submission of a trade order with a lower level of risk (e.g., a price of 97.7 or a quantity of 50 contracts). In some embodiments, the delay period is for a randomly selected period of time. In some embodiments, the delay period may be just long enough to force the trader to consider or re-consider the trade action. For example, the length of the fixed period of time may be long enough to prevent a trader from quickly clicking through the initiation and confirmation.

In some embodiments, the delay period may be for a period of time randomly selected, for example, by the trading device 110.

While in the delay period 410, the market participant is unable to confirm the trade action using the same trade action cell. For example, when the user attempts to make a selection 402 at time T2, the selection does not confirm the trade action. For example, the selection may be ignored. In another example, the selection may trigger a message to the user that indicates that the delay period has not lapsed. In some embodiments, the computing device may change the visual representation of the trade action cell when the trade action is initiated. For example, the trade action cell may begin flashing at time T1.

As shown in FIG. 3, at Block 325, a confirmation period 425 begins. This may occur upon expiration of the delay period 410 (e.g., when the delay period lapses). For example, the confirmation period 425 may occur at (or shortly after) the end of the delay period 403. As shown in FIG. 4, the confirmation period 425 is representative of the period of time between the lapse of the delay period 403 (which occurs at time T3) and the end of the confirmation period 405 (which occurs at time T5). Similar to the delay period 410, in some embodiments, the confirmation period 425 may be for a fixed period of time. In some embodiments, the confirmation period 425 may be for a predefined period of time. In some embodiments, the confirmation period 425 may be for a period of time randomly selected by the computing device. In some embodiments, the confirmation period does not have an end. It continues until the trade action is confirmed or the user cancels the trade action.

In some embodiments, during the confirmation period 425, the user may select the same trade action cell (that was used to initiate the trade action) to confirm the trade action. For example, in some embodiments, the user reselects 404 the trade action cell at time T4. By allowing the user to reselect the trade action cell to confirm a trade action, the user is able to save time by not having to relocate the cursor to a separate confirmation window. Furthermore, by leaving the cursor in the same point (or at least in the same vicinity) where the trade action was initiated, the user saves time by not having to move the cursor back to the general vicinity where trade actions are initiated once the trade action has been confirmed. This may allow the user to make other trade actions that are similar to the trade action that was confirmed. In some such embodiments, the trading device 110 receives the confirmation command and then executes the trade action initiated at Block 300, as described earlier with respect to FIG. 1.

In some embodiments, the user may select a cancel confirmation cell during the confirmation period 425. In some embodiments, the trade action initiated in Block 300 is canceled. As used herein, canceling a trade action may include canceling, clearing, ignoring, or otherwise not performing the trade action. In some embodiments, a market participant may select anywhere on the trading interface but outside of the trade action cell to cancel the initiated trade action. In some other embodiments, the user may make no selection during the confirmation period 425, thereby canceling the initiated trade action by allowing the trade action to time-out. In such embodiments where the trade action is canceled, the trading device 110 communicates no trade actions relating to the initiated trade action 300 to the gateway 120 or electronic exchange 130.

FIG. 4 illustrates a delay period 410 starting at time T1, when the trade action was initiated (e.g., a trade action was selected 401), and continuing for a predefined period of time until time T3. In some embodiments, if the user attempts to confirm 402 a trade action during the delay period (e.g., at time T2), the confirmation command is, for example, ignored or otherwise not performed. At time T3, a confirmation period 425 begins and continues through a predefined period of time. In some embodiments, if the user makes no confirmation action by predefined period of time T5, the initiated trade action times out. Alternatively, in some embodiments, if the user selects 404 a trade action cell at time T4, then the confirmation command is acted upon and the initiated trade action is executed.

Figure 5:
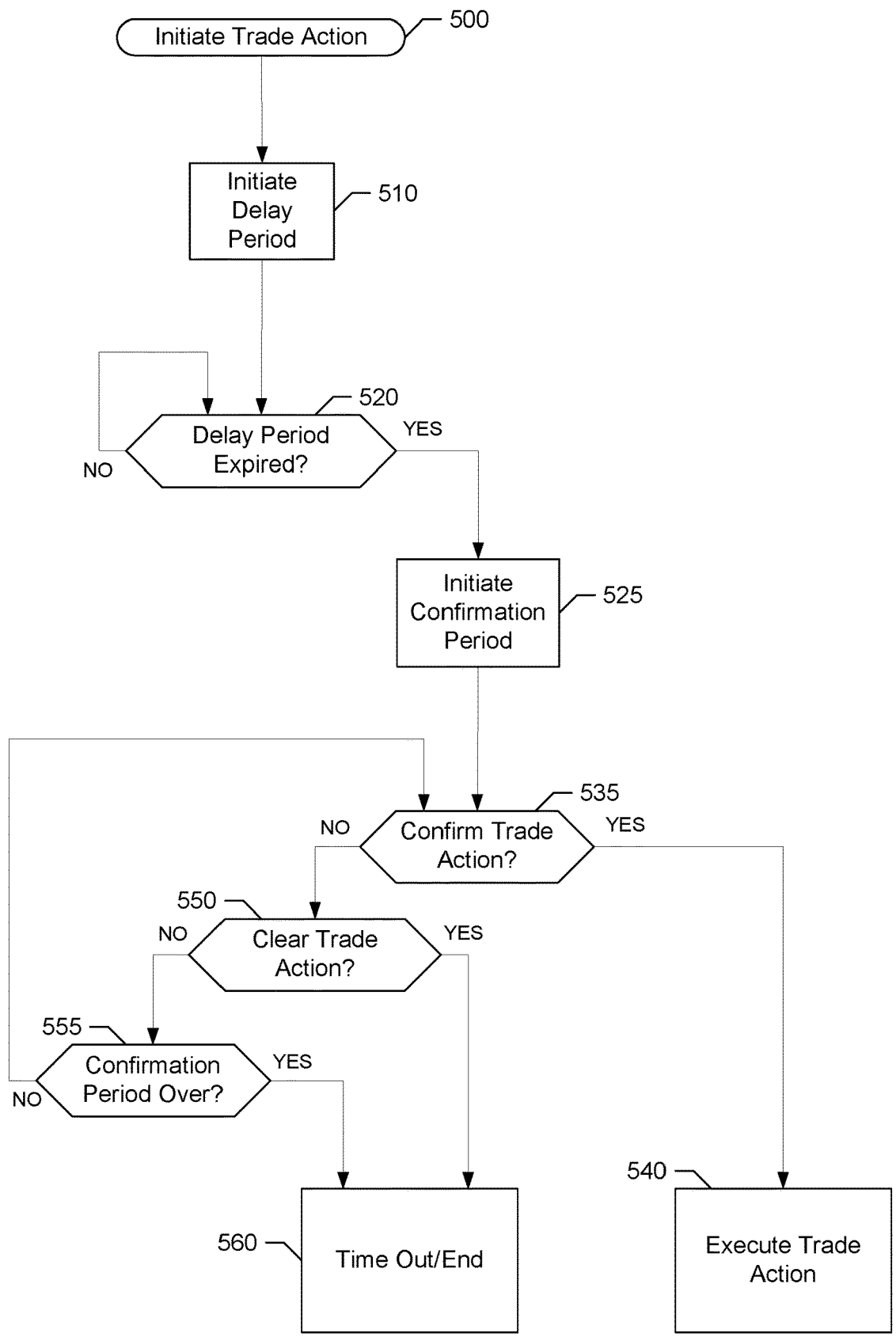
FIG. 5 is a flowchart describing an example method for confirming a trade action.

FIG. 5 is a flow chart describing an example method for confirming a trade action. At Block 500, a trade action is initiated. In some embodiments, initiating and/or confirming a trade action may occur automatically (e.g., without receiving input from the market participant). In some embodiments, the trade action may be initiated automatically by a trading algorithm, and may require the market participant to confirm the trade action. For example, the trading device 110 may include a trading application that algorithmically processes market data and includes a user interface for manual placement of orders based on the algorithmic processing or to manipulate orders that were placed automatically.

In some embodiments, initiating and/or confirming a trade action may include receiving the selection of a trade action cell by a market participant. In some embodiments, selecting a trade action cell may include clicking on a trade action cell (e.g., one, two, or more clicks on a cell). A trade action cell is a cell, button, or area on a trading screen that corresponds to a particular trade action. When the trade action cell is selected, the trading device 100 may perform the corresponding trade action.

At Block 510, in some embodiments, after the trade action has been initiated, a delay period is initiated. In some embodiments, the trade action cell is disabled once the delay period is initiated. In some such embodiments, the market participant is unable to confirm a trade action using the same trade action cell. Disabling the trade action cell may help reduce the possibility that a user will either accidentally or intentionally confirm a trade action. For instance, a market participant may be in the habit of double clicking a trade action cell. In some such embodiments, disabling the trade action cell may attempt to force the market participant to mentally consider the trade action they are confirming before they actually confirm the trade action. As used herein, disabling a trade action cell may include not performing the associated trade action. Some functionality may still exist with a disabled trade action cell. For example, when a disabled trade action cell is selected, the trading device 110 may display a message to the user (e.g., "the trade action cannot be confirmed until the end of the delay period" or some other relevant message).

In some embodiments, initiating the delay period may visually change the trade action cell. The visual change may draw attention to the trade action cell that was initiated. In some such embodiments, the visual change may include visually changing the background color of the trade action cell. In some embodiments, the visual change may include visually changing the text color of the trade action cell. In some embodiments, the visual change may include visually changing some other visual aspect, including the actual text, formatting, and/or image, of the trade action cell. In some embodiments, other visual aspects of the trade action cell which may be visually changed include removing contents of the trade action cell entirely or filling the trade action cell with a solid color. In some embodiments, the visual change may include a combination of these embodiments.

In some embodiments, the visual change to the trade action cell may occur once. In some embodiments, the visual change to the trade action cell may repeatedly occur. In some such embodiments, the background color or text color of the trade action cell may begin to flash or blink once the delay period has been initiated.

Figure 6A:
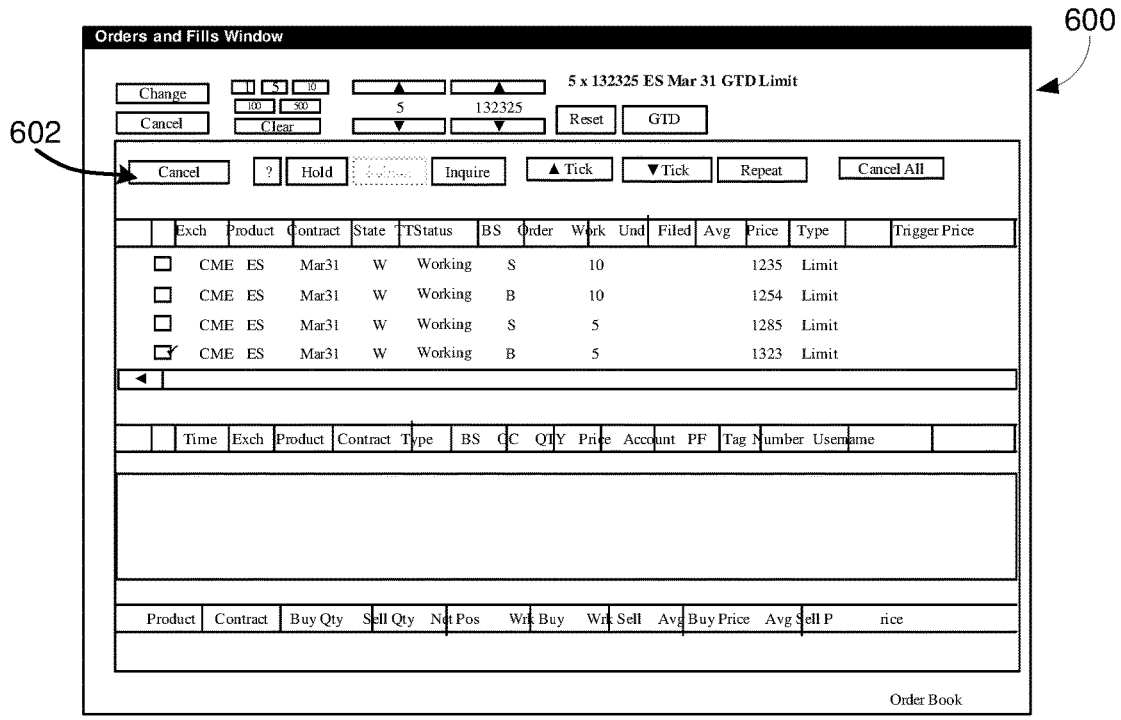
FIGS. 6A and 6B together depict an example of visually changing a cell of an order/fill window.

FIG. 6A illustrates an order/fill window 600. The order/fill window 600 includes various trade action cells used by market participants to perform trade actions. One of these trade action cells is a cancel cell 602. The cancel cell 602 is used to cancel working trade orders. A working trade order is a trade order that has already been submitted to an electronic exchange. For example, a market participant may submit a trade order to buy tradeable object A at a price of 97.8. The exchange may receive this trade order, for example, which may have been sent in an order message, and begin to attempt to match this trade order against contra-side trade orders (e.g., an order to sell tradeable object A at a price of 97.8). The trade order to buy tradeable object A is considered a working order until it has been matched by the exchange. In some instances, a market participant may desire to cancel working orders for one or more reasons.

In some embodiments, for example, as shown in FIG. 6A, since the order to buy 5 contracts of the ES is selected (e.g., check mark in the box), selecting the cancel cell 602 will cancel this working order. In some embodiments, the market participant decides to select the cancel cell 602 (e.g., by clicking on the cancel cell 602 of FIG. 6A) to cancel this working order. In this example, the trade action is sending a trade order cancelling the working order. In this example, the trade action cell is the cancel cell 604. Selecting the cancel cell 604 will initiate the trade action.

Figure 6B:
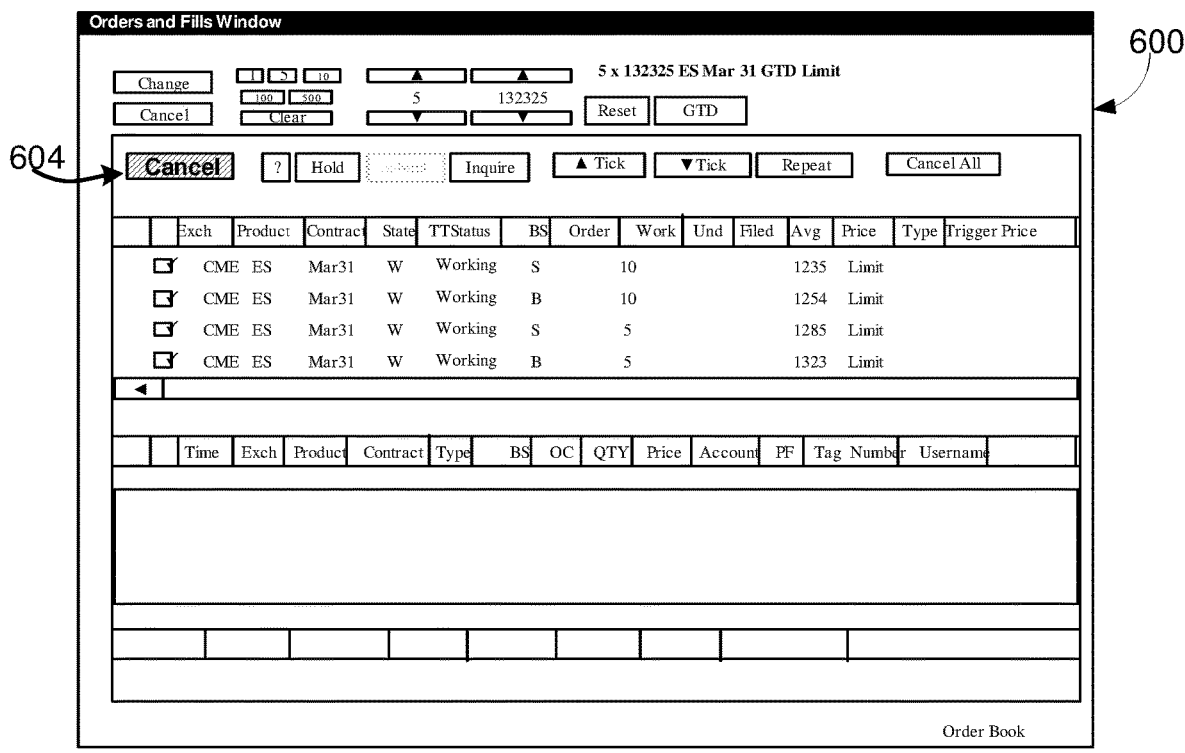

As shown in FIG. 6B, once the cancel cell 604 is selected, the cancel cell 604 may begin to flash (e.g., shown by the slanted lines inside cell 604) to indicate that the delay period (or the confirmation period) has begun. In some embodiments, the flashing cancel cell 604 may continue to occur until the trade action is confirmed or times out.

While FIGS. 6A and 6B illustrate confirmation in an order/fill window 600, this confirmation technique may be used in other trading screens. For example, the confirmation technique may be used with a trading tool such as an order entry ladder (e.g., provided by MD TRADER®). In some embodiments, in addition to visually changing the cell, the position of the trade action cell may also be locked, such as, for example, a trading interface where the trade action cell may move around (e.g., MD TRADER®). This may prevent the market participant from selecting another trade action cell when they are trying to confirm a trade action.

Figure 7:
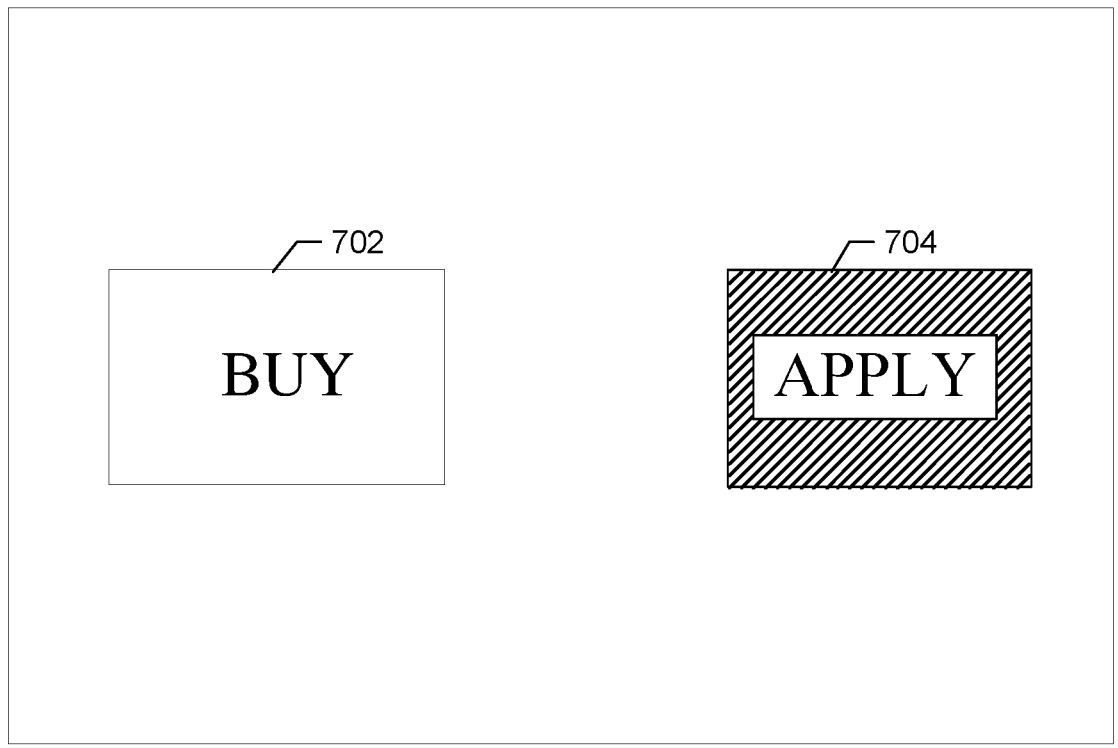
FIG. 7 illustrates an example of alternating the background color and text in a trade action cell.

FIG. 7 illustrates an embodiment in which both the background color and the actual text of the trade action cell may visually change. For example, one trade action cell that may be used during operation is a buy cell 702. Once the user selects the buy cell 702, the trade action cell changes to a seemingly different trade action cell, apply cell 704, where the text in the trade action cell changed from "BUY" to read "APPLY" and the background of the trade action cell also changed, as indicated by the diagonal lines.

Returning to the flow chart in FIG. 5, once initiated at Block 510, a delay period may execute for a defined period of time (e.g., 20 ms, 50 ms, 100 ms, 200 ms, 750 ms, 1 second, 2 seconds, etc.). In some embodiments, the delay period is for a predefined period of time. In some embodiments, different trade actions may have different predefined delay periods. In some embodiments, different trade parameters may influence the length of the delay period. In some embodiments, the delay period is for a randomly selected period of time. In some embodiments, the delay period is as short as possible, while preventing accidental or habitual confirmation.

At Block 520, a determination is made as to whether the delay period has expired (e.g., counter ticking down, timer expiring, polling to detect an end condition, etc.). If the delay period has not expired, the method returns to Block 520. At Block 525, in some embodiments, if the delay period has elapsed, a confirmation period is initiated. Initiating the confirmation period enables for selection the trade action cell that was disabled during the delay period. In some embodiments, specific visual changes from the delay period may continue during the confirmation period and other visual changes may stop. In some embodiments, for example, the flashing trade action cell 604 of FIG. 6B may stop flashing. In some embodiments, some other visual changes to the trade action cell during the confirmation period may indicate to the user that the trade action cell is capable of being selected. In some embodiments, the visual changes that occurred at Block 510 continue during the confirmation period.

At Block 535, in some embodiments, a determination is made as to whether the user confirms the initiated trade action. In some embodiments, confirming the trade action may be done by selecting the same trade action cell that was used to initiate the trade action. At Block 540, in some such embodiments, once the confirmation command is received, the initiated trade is then executed. Executing the trade action is then done in the same way as was described earlier in connection with FIG. 1.

In some embodiments, the user may not confirm the trade action. In some such embodiments, a determination is made, at Block 550, as to whether the user has cleared the initiated trade action. In some embodiments, the user may clear the trade action by selecting a different cell to cancel confirmation. In some embodiments, the market participant may clear the initiated trade action by clicking outside of the trade action cell that was used to initiate the trade action. At Block 560, in some embodiments, the trade action times out when the user has chosen to clear the initiated trade action.

In some embodiments, the user may not choose to actively cancel the initiated trade action. For example, the user may make no selection. At Block 555, in some embodiments, a determination is made as to whether the confirmation period is over. In some embodiments, when the confirmation period has not elapsed, the method returns to Block 535.

In some embodiments, a determination is made as to whether the confirmation period has expired and the trade action was not confirmed. In some such embodiments, the trade action may then time out at Block 560. For example, if a market participant initiates a trade action (e.g., to buy a tradeable object at a certain price) and the trade action was not confirmed for a certain period of time, then the trade action is not performed. When an initiated trade action is cleared or times out, the trade action is not sent to an exchange.

In view of the foregoing, it should be apparent that the disclosed example systems, methods and apparatus may be used to provide an improved electronic trading environment. Example systems, methods, and apparatus confirm a trade action using the same trade action cell that was used to initiate the trade action, thereby reducing time spent by the market participant to relocate the cursor for confirming a trade action.

Various inventions have been described in sufficient detail with a certain degree of particularity. It is understood to those skilled in the art that the present disclosure of embodiments has been made by way of examples only, and that numerous changes in the arrangement and combination of parts may be made without departing from the spirit and scope of the present disclosure as claimed. While the embodiments discussed herein may appear to include some limitations as to the presentation of the information units, in terms of the format and arrangement, those skilled in the art will appreciate that the embodiments have applicability well beyond the disclosed examples. Accordingly, the scope of the present disclosure is defined by the appended claims rather than the forgoing description of embodiments.

We claim:

1. A non-transitory, computer-readable medium having stored therein instructions executable by a processor, including instructions executable to:
   receive an initiation command through a selection of a trade action cell of a graphical user interface, wherein the trade action cell is a graphical element on the graphical user interface that is selectable by a user, wherein the trade action cell is associated with a trade action including a trade parameter;
   determine, in response to receiving the initiation command, a delay period, wherein the delay period is based on the trade parameter of the trade action, wherein the delay period begins when the initiation command is received;
   change a visual representation of the trade action cell after the initiation command is received and before a confirmation command is received;
   ignore any attempted confirmation command, wherein the attempted confirmation command is received through a selection of the trade action cell during the delay period;
   receive the confirmation command through a selection of the trade action cell after the delay period; and
   execute, in response to receiving the confirmation command, the trade action.

2. The non-transitory, computer-readable medium of claim 1, wherein the visual representation of the trade action cell is changed for a duration of the delay period.

3. The non-transitory, computer-readable medium of claim 2, further including instructions executable to:
   change the visual representation of the trade action cell after the delay period and before the confirmation command is received.

4. The non-transitory, computer-readable medium of claim 1, wherein the visual representation of the trade action cell is changed when the initiation command is received.

5. The non-transitory, computer-readable medium of claim 1, wherein the visual representation of the trade action cell is changed until the confirmation command is received.

6. The non-transitory, computer-readable medium of claim 1, wherein the visual representation of the trade action cell is changed after the delay period.

7. The non-transitory, computer-readable medium of claim 1, wherein the trade parameter is a quantity associated with the trade action.

8. The non-transitory, computer-readable medium of claim 1, wherein the trade parameter is a price associated with the trade action.

9. The non-transitory, computer-readable medium of claim 1, wherein the trade parameter is a side associated with the trade action.

* * * * *